March 13, 1945.    A. C. HOOF    2,371,293
HYDRAULIC VALVE
Filed Oct. 18, 1941
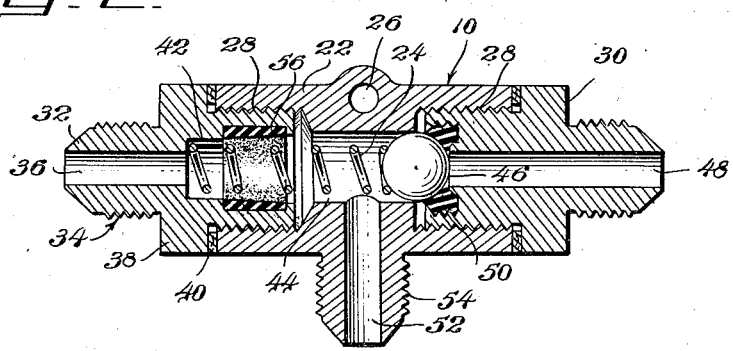
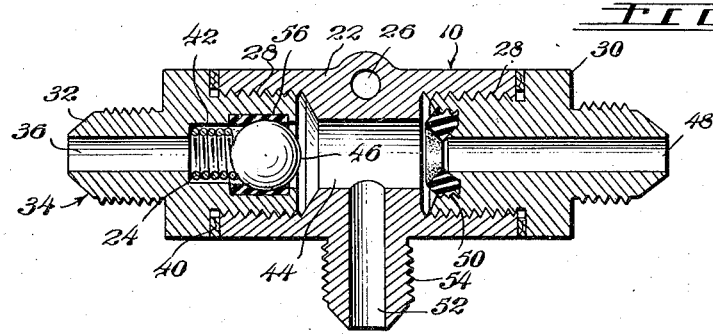
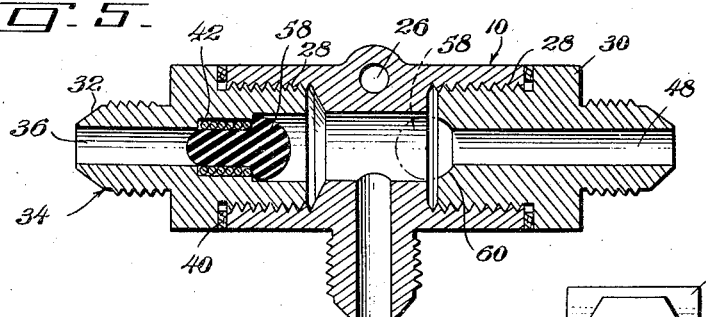
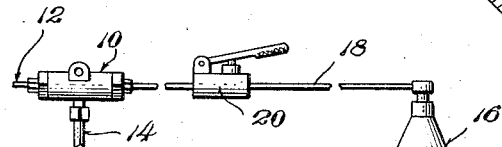
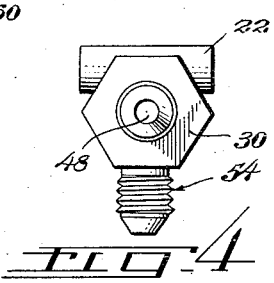
Inventor
ADDISON C. HOOF
By Cox, Moore & Olson
Attorney Patented Mar. 13, 1945

2,371,293

UNITED STATES PATENT OFFICE 2,371,293

HYDRAULIC VALVE

Addison C. Hoof, Hinsdale, Ill.; Frances A. Hoof, Hugh C. Kepner, and Walter Eckert, executors of Addison C. Hoof, deceased Application October 18, 1941, Serial No. 415,618

4 Claims. (Cl. 251—118)

The present invention relates to a hydraulic safety device and more particularly to a valve permitting independent control from a plurality of sources.

More particularly, the invention contemplates the provision of a unit applicable to hydraulic systems and automatically responsive under conditions of emergency to permit operation of the system from an auxiliary source. Thus, widespread extension of the art of hydraulic operation and control has resulted in application of such systems to relationships wherein continued operability becomes of prime significance, such for example as in aircraft control including operating of landing gears, control surfaces, and the like. Such hydraulic systems operating under fluid pressure are at all times subject to failure by leakage or depletion of the hydraulic fluid rendering impossible the maintenance and creation of necessary pressure differentials and a failure of associated pressure responsive instrumentalities.

The present invention therefore contemplates the provision of an auxiliary source of fluid pressure available at all times in the event of failure of the normal hydraulic instrumentalities.

It is accordingly an important object of the present invention to provide a system wherein the auxiliary source of hydraulic pressure is normally sealed and disconnected from the main system but is operative upon occurrence of failure to take over the operating functions.

Another object of the invention is to provide a unitary control insertable into the normally operable hydraulic system for connecting therewith the auxiliary source of pressure for instantaneous operation.

A further object of the present invention contemplates the provision of a device as above capable of automatically transferring control from any of a plurality of hydraulic sources but operable to seal off the hydraulic source not in use.

Yet further objects will be apparent from a consideration of the following specification when taken in conjunction with the accompanying drawing, wherein Figure 1 is an elevational view representing a system embodying the principles of the present invention.

Figure 2 is a sectional view taken centrally transversely through the transfer valve of Figure 1 and showing the parts in normal operating position.

Figure 3 is a view the same as Figure 2 showing the parts operatively disposed upon utilization of the auxiliary system.

Figure 4 is an end elevational view of the transfer valve.

Figure 5 is a sectional view the same as Figures 2 and 3 but showing a modified form of the invention.

Referring now to Figures 1–4, wherein there is illustrated one preferred form of construction embodying the principles of the present invention, it will be seen that there is provided a transfer valve construction illustrated generally by the reference numeral 10 connected with a normally operable hydraulic system represented by the conduits 12 and 14. The conduit 12 in the present embodiment may comprise an inlet conduit leading from a source of hydraulic pressure adapted to operate any suitable instrumentality, not illustrated, connected to outlet conduit 14. An auxiliary source of pressure is represented by the pressure tank 16 having an outlet conduit 18 leading through control valve 20 to the transfer valve 10.

The construction of the transfer valve 10, as shown more clearly in Figures 2 to 4, involves a central block or casting 22 provided with a central axial bore 24 of cylindrical form and having a transverse aperture 26 for receiving a fastening adapted to mount the valve in any desired position. At both axial extremities, the body casting 22 is bored and threaded as at 28 to receive oppositely disposed nipples 30 and 32. Nipple 32 has an outer threaded portion 34 formed to receive any conventional pressure fitting or coupling on the extremity of the inlet conduit 12 and is centrally bored as at 36 to convey fluid toward the central chamber 24. The nipple 32 is centrally flanged or enlarged as at 38 to grip a suitable washer or packing 40 in sealing relationship with the extremity of the casting 10. Just inwardly of the passageway 36, the nipple is provided with a relatively enlarged counterbore 42 providing a shoulder to receive the end of a coil compression spring 44 and, as clearly shown in Figure 2, the opposite end of the coil compression spring acts against a valve member comprising, in the present embodiment, a rigid sphere 46. It will be apparent therefore that the spring normally urges the valve member 46 away from the vicinity of the nipple 32 and in sealing relationship with the opposed nipple 30.

To this end, it will be appreciated that the nipple 30 possesses a structure quite similar to that of the nipple 32 with the exception that the central passageway 48 passes completely axially therethrough without enlargement. In the vicinity of the inner extremity of the passageway, however, the nipple 30 is annularly recessed as shown to receive an annular valve seat 50, in the present embodiment formed of any suitable elastic or resilient material such as rubber, artificial rubbers or any of the equivalent plastics. Attention is directed to the fact that the elastic or resilient valve seat is disposed to present annularly inclined surfaces conically arranged with respect to the axis of the passageway and thus operative to coact with the surface of the sphere for normally sealing the passageway 48. The invention accordingly, therefore, contemplates the provision of structure wherein the hardened valve member 46 seats solely upon a resilient surface throughout its circumferential extent and it will be evident that, when a high pressure fluid source is applied to the inlet passageway 36 to place the system under pressure, this pressure acts against the valve to additionally urge the sphere into sealing relationship.

An outlet passageway 52 is provided in an outwardly projecting threaded extension 54 of the main body member for connection with the pressure fitting or coupling of the outlet conduit 14.

In accordance with the present invention, means is provided for positively and preferably permanently sealing communication between passageways 36 and 52 upon failure of the pressure source in the former conduit and to this end it will be noted that the innermost extremity of the central passage in the nipple 32 is provided with an enlarged bore comparable with the bore or chamber 24 of the main body portion. Just inwardly of this bore, the recess is enlarged as shown to receive an elastic or yieldable annular insert 56. Attention is particularly directed to the fact that the inner surfaces of the elastic member 56 are conically disposed about the central axis of the valve passageway so that they taper toward the outer extremity thereof. It should be further noted that the degree of taper is such as to receive the sphere 46 only under considerable compression and in such a manner as to more or less permanently receive the sphere therein when once it has been actuated to the position shown in Figure 3 by application of suitable pressure from the source 16 and hold it against the action of the spring 44. In other words, the degree of axial taper of the elastic member 56 is such as to receive the sphere 46 under a progressively increasing radial tension ultimately adapted to encompass the sphere in the region of its greatest circumference and permanently hold it against withdrawal. Thus, as illustrated in Figure 3, with the sphere forced sufficiently into the receiving portions of the valve, the resilient material becomes elastically urged against the sphere on both sides of its line of greatest circumference, resisting movement in both directions.

It is furthermore significant to note that the annular elastic insert is recessed substantially into the body of the nipple to provide an elastic mass capable of resiliently receiving the material displaced by insertion of the sphere and operative to exert an elastic reaction inwardly thereagainst. For purposes of illustration, comparison is made with the elastic insert 50 previously referred to which is so disposed as to be normally incapable of receiving the sphere in such a manner as to prevent retraction. In short, the last mentioned valve seat construction provides a sealing surface against which the sphere is adapted to reside but from which it is axially removable, whereas the valve seat member 56 of relatively slight taper is adapted to bodily receive the valve member and embrace it to effectively resist withdrawal.

It is thought important to point out that the configuration, and particularly the degree of conical taper on the inner face of the resilient insert 56, is of critical importance in embodiments where the valve member is to remain permanently sealed therewithin. In other words, the specific angularity of the taper shown in the drawing is preferred and necessary in order to perform the foregoing function, and while a slight increase in the angle this tapered surface makes with respect to the axis of the sleeve may be permitted, the configuration should be approximately at or about that shown in the drawing, at least insofar as the upper limits of the foregoing angle is concerned. On the other hand, it will be obvious that the degree of angularity may be decreased somewhat so long as the ball is adapted to wedge forcibly therein as shown in Figure 3.

From the foregoing, it will be apparent that in operation the sphere 46 resides normally in the position shown in Figure 2, in which position fluid under pressure applied to the inlet passageway 36 serves to control any desired instrumentalities connected with the outlet passageway 52. At such times, the auxiliary pressure source remains inoperative and its passageways sealed by the sphere 46. Assuming, however, the occurrence of a failure in the conduit 12 or at the related source of the pressure, such as would normally prevent the operation of the desired instrumentalities, the operator need merely actuate the valve 20, Figure 1, to admit fluid pressure from the source 16 into the passageway 48. The pressure acting upon the sphere 46 urges it to the left and away from the seat 50, thus opening communication between passageways 48 and 52 and admitting fluid pressure to the outlet conduit 14. The flow of pressure further proceeds to urge the valve to the left against spring 44 and into permanent operative interengagement with the tapered resilient valve seat 56, or in other words, to the position shown in Figure 3. At such times, the system will continue to operate under the influence of auxiliary pressure source 16 controlled by valve 20 without hazard of failure or leakage through the passageway 36. In short, the invention contemplates positively transferring control from the source at the inlet conduit 12 to the auxiliary pressure conduit 18.

It will be apparent from the foregoing that the present structure is of material value and importance in connection with hydraulic systems in which failure may constitute a serious hazard, such for example as in control systems incident to the operation of aircraft or vehicles. In such instances, provision of an auxiliary pressure device under the control of the operator prevents complete and catastrophic failure.

It will be apparent from the foregoing that the valve member 46 in the embodiment shown is preferably formed of some relatively hard material and adapted to coact with the yieldable or elastic material of the valve seats in the manner described and it will be understood from the foregoing that the specific shape of the valve member and its seat may be varied within wide limits insofar as they coact in the manner defined above.

The invention contemplates, where desirable, reversal of parts in such a manner as to accomplish the same or equivalent function. To this end, there is shown in Figure 5 a preferred modification of the invention wherein the movable valve member comprises a spherical shaped body of elastic material 58 as indicated by the dotted line representation. Actuation of this sphere to the left under the influence of a substantial hydraulic pressure in the passageway 48 may result in substantial distortion thereof as shown by the full lines at the left hand portion of the drawing for effecting permanent interengagement with the valve port. To this end, of course, it will be appreciated that the resilient valve seat member may be, and preferably is, omitted so that the resilient movable valve member coacts with a seat or shoulder formed of relatively hard material. In either construction, it will be apparent that the movable valve member functions at one extremity of its path of travel to removably seal the auxiliary fluid source and at the other extremity to preferably permanently seal the main source of hydraulic pressure. It may be noted that in the present modification the yieldable valve member in its normal position seats against the spherical surface sectors 60 formed by the relatively rigid portions of the nipple 30, the yieldability of the sphere 58 serving to produce sealing interengagement.

From the foregoing it will be apparent that irrespective of which of the coacting valve members if relatively elastic, the foregoing desired functions may be availed to result in the improved results described.

In accordance with the foregoing, it will be appreciated that the term "elastic" or "yieldable" material, or even the term "rubber," is meant to include not only rubber but such equivalent elastic or yieldable materials as are capable of possessing the desired properties. Thus for example are included the various so-called artificial rubbers and preferably such well known materials as "Neoprene," "Thiokol," butadienes, and the like, preferably where oily fluids are employed.

The present invention provides a very simple safety device capable of being constructed of light weight material and occupying only a minor space, but operable at all times for assuring the functioning of hydraulically responsive instrumentalities.

Obviously, the invention is not limited to the specific structural arrangement disclosed herein but is capable of other modifications and changes without departing from the spirit and scope of the present invention.

I claim:

1. An hydraulic transfer valve for fluid pressure systems comprising a chamber having an inlet port, an outlet port, and an auxiliary inlet port; a valve seat member in said inlet port; valve means in said chamber; and valve spring means extending through said valve seat member and tending normally to bias said valve means to close said auxiliary inlet port, said valve seat member being resilient and so shaped as to engage and interlock with said valve means under pressure coming from the auxiliary inlet port and hold it in positive sealing position against the action of said valve spring means.

2. An hydraulic transfer valve for fluid pressure systems comprising a chamber having an inlet port, an outlet port, and an auxiliary inlet port; a valve seat member in said inlet port; valve means in said chamber; and valve spring means extending through said valve seat member and tending normally to bias said valve means to close said auxiliary inlet port, said valve seat member being resilient and having a coned recess at said inlet port to engage and interlock with said valve means under pressure coming from the auxiliary inlet port and hold it in positive sealing position against the action of said valve spring means.

3. An hydraulic transfer valve for fluid pressure systems comprising a chamber having an inlet port, an outlet port, and an auxiliary inlet port; a valve seat member in said inlet port; valve means in said chamber, and valve spring means extending through said valve seat member and tending normally to bias said valve means to close said auxiliary inlet port, said valve seat member being resilient and having a coned recess to encompass bodily and interlock said valve means under pressure coming from the auxiliary inlet port and hold it in positive sealing position against the action of said valve spring means.

4. An hydraulic transfer valve for fluid pressure systems comprising a chamber having an inlet port, an outlet port, and an auxiliary inlet port; a ball valve in said chamber; valve actuating means tending normally to close said auxiliary inlet port, a resilient valve seat having a coned recess at said inlet port to encompass bodily and interlock said ball valve under pressure coming from the auxiliary inlet port and hold it in positive sealing position against the action of said valve actuating means.

ADDISON C. HOOF.